United States Patent [19]

Koch, II

[11] 4,342,615

[45] Aug. 3, 1982

[54] PLYWOOD LAYUP LINE

[75] Inventor: Robert L. Koch, II, Evansville, Ind.

[73] Assignee: George Koch Sons, Inc., Evansville, Ind.

[21] Appl. No.: 190,585

[22] Filed: Sep. 25, 1980

Related U.S. Application Data

[63] Continuation-in-part of Ser. No. 32,737, Apr. 24, 1979.

[51] Int. Cl.[3] .............................. B32B 31/00

[52] U.S. Cl. .............................. 156/563; 156/299

[58] Field of Search .............................. 156/557, 558, 559, 561, 156/563, 299

[56] References Cited

U.S. PATENT DOCUMENTS 3,620,887 11/1971 Nelson .............................. 156/563

3,725,183 4/1973 Brookhyser .............................. 156/563

3,795,560 5/1974 Matsumoto .............................. 156/563 X

*Primary Examiner*—David A. Simmons

*Attorney, Agent, or Firm*—Jenkins, Coffey, Hyland, Badger & Conard

[57] ABSTRACT

A method and apparatus for assembling plywood laminate structures on a plywood assembly line utilize a first conveyor extending through an assembly area. Plywood back sheets are loaded onto the entry end of the first conveyor in end-to-end abutting relationship and the first conveyor conveys the back sheets, additional laminate layers (such as core layers), and complete laminate structures at constant speed from the entry end to the first conveyor's exit end. The method and apparatus utilize a first curtain coater to coat the top side of the back sheets with a laminating adhesive. The first curtain coater is positioned upstream from and adjacent the entry of the first conveyor. Additional side conveyors convey plywood core laminate layers and face sheets to assembly stations along the first conveyor. Additional curtain coaters are utilized as required to coat the top sides of the core laminate layers moving along such additional conveyors with laminating adhesive. Such additional curtain coaters are positioned between the entry and exit ends of the additional conveyors.

16 Claims, 3 Drawing Figures

PLYWOOD LAYUP LINE

This is a continuation-in-part of my earlier filed co-pending patent application Ser. No. 32,737, filed Apr. 24, 1979.

This invention deals with assembly lines for assembling laminate structures, and particularly to a type of plywood assembly line.

Plywood assembly lines are known. The following United States patents disclose various kinds of apparatus and methods for making plywood: Nos. 3,795,560; 3,841,945; 3,620,887; 3,730,816; 3,438,830; 3,616,090; 3,580,778; 3,725,183; 3,914,154; 3,919,954; 3,963,552; 3,367,823; 3,133,850; 3,084,090; and 3,003,541.

Of these various types of processes and equipment, those most pertinent to the instant application involve delivering a first laminate layer, such as a plywood back sheet, with adhesive on the upper surface thereof, from a first side conveyor to a main conveyor running through an assembly area, with the direction of delivery of the first laminate layer from the side conveyor being transverse to the main conveyor, delivering a second laminate layer, such as a core laminate layer with adhesive on the top surface thereof, and stacking or compiling the second laminate layer on top of the first, then stacking additional laminate layers with adhesive on their upper surfaces only, as desired, from additional side conveyors which extend transverse to the direction of motion of the main conveyor, and finally compiling an uppermost laminate layer, or face sheet, without adhesive on its top surface, to form a completed plywood laminate structure, which may then be cut to size and pressed as desired to reduce the laminate structure thickness to substantially the desired finished plywood thickness. In such techniques, flow or spray coating of adhesive generally is used. Significantly, such methods teach a side conveyor extending transversely of the main conveyor to convey the first veneer laminate layer, the back sheet, to the main conveyor. This is done primarily to insure that the adhesive thickness does not vary as a result of waviness in the first veneer laminate layer across the grain. Rather, using these techniques, adhesive is applied along the direction of the grain. An example of this type of system is the above-identified U.S. Pat. No. 3,795,560.

Some of the above-noted systems use bottom veneer plies, back sheets, arranged end-to-end and conveyed continuously under a core assembly unit where core strips are deposited in edge-abutting relationship, trimmed to desired panel widths, and laid upon the bottom plies, the back sheets, after which overlay veneer plies, face sheets, are laid end-to-end over the core plies and the resulting plywood laminate structure is conveyed to a cut-off unit, where it is cut to plywood panel lengths for subsequent stacking and delivery to a press. An example of this type of system is the above-noted U.S. Pat. No. 3,620,887.

Yet another type of system illustrative by one of the above-noted patents teaches lay-up of cross-bonded, multiple-ply plywood panels by moving veneer sheets (such as back sheets) and core sheets along a main conveyor line, one after the other, through a glue applicator. The applicator applies a glue coating to the upper surface of the sheets, which are then moved to a stacking region where the core and veneer sheets are stacked one on top of the other in the order in which they have been carried on the main conveyor line. Additional veneer sheet supply means positioned in line with the main conveyor line delivers veneer facing sheets to the conveyor line, with the face sheets being fed onto the main conveyor line downstream from the glue applicator to prevent glue coating of the face sheets. The uncoated face sheets are laid on top of the stack of core and veneer sheets in the stacking region. See the above-identified U.S. Pat. No. 3,730,816.

An object of the present invention is to provide a plywood assembly line which is of a sufficiently flexible design to permit its adaptation to produce plywood having several different multiple-ply configurations (e.g., 3-ply, 4-ply, 5-ply, 7-ply, etc.).

Another object of the present invention is to provide a system requiring less labor, as well as a system which permits savings in material (wood and laminating adhesives) over many prior art systems.

Another object of the present invention is to provide a system which gives precise laminating adhesive thickness control.

According to the present invention, a method and apparatus for assembling plywood laminate structures on a plywood assembly line include the following: first means conveys plywood laminate layers through an assembly area. The first conveyor means extends longitudinally for substantially the full length of the assembly area and includes an entry end at which plywood back sheets are introduced onto the first conveyor means, and an exit end from which completed plywood laminate structures are removed from the first conveyor means. The plywood backing sheets are introduced onto the entry end of the first conveyor means in end-to-end abutting relationship and the first conveyor means conveys the back sheets, additional laminate layers (such as core layers), and complete laminate structures at constant speed from the entry end to the exit end of the first conveyor means. The method and apparatus utilize a first curtain coater, of the general type described in Glaus U.S. Pat. No. 3,067,060 and available from ASHDEE Division of George Koch Sons, Inc., 10 South Tenth Avenue, Evansville, Ind. 47702.

The first curtain coater is utilized to coat the top side of the back sheets with a laminating adhesive. The first curtain coater is positioned upstream from and adjacent the entry of the first conveyor means. A second conveyor means is utilized to convey plywood core laminate layers, with the second conveyor means extending from an entry end remote from the first conveyor means at an angle, illustratively 90°, toward an exit end adjacent the first conveyor means. The exit end of the second conveyor means is positioned along the first conveyor means between the first conveyor means entry end and the first conveyor means exit end. The second conveyor means operates at a speed at least equal to the speed of the first conveyor means. A second curtain coater is utilized to coat the top side of the core laminate layers moving along the second conveyor means with a laminating adhesive. The second curtain coater is positioned between the entry and exit ends of the second conveyor means. The top-side adhesive-coated core laminate layers are deposited onto the adhesive-coated top side of the end-to-end abutting layer of back sheets moving on the first conveyor means. A substantially end-to-end abutting layer of back sheet-core laminate layer substrate with an upwardly facing, substantially continuous, laminating adhesive-coated surface is thus formed.

Third conveyor means are utilized to convey plywood face sheets. The third conveyor means extends from an entry end remote from the first conveyor means at an angle toward an exit end adjacent the first conveyor means. The third conveyor means exit end is positioned along the first conveyor means between the second conveyor means exit end and the first conveyor means exit end. The third conveyor means operates at a speed at least equal to the speed of the first conveyor means. The face sheets are deposited onto the laminating adhesive-coating top surface of the substantially end-to-end abutting back sheet-core laminate layer substrate to form a completed plywood laminate structure.

As used herein, the phrase "at a speed at least equal to" is intended to mean that the second, third, and further conveyor means are capable of delivering at least as many board feet of a laminate layer as are conveyed through the assembly area on the first conveyor means. It will be appreciated that this is necessary to form and maintain a substantially end-to-end abutting layer of back sheet-core laminate layers substrate, and to prevent waste of such substrate in the deposit of face sheet and the final triming of this substantially continuous completed plywood laminate structure as it flows from the exit end of the first conveyor means.

Stated broadly, the inventive apparatus for assembling plywood laminate structures on a plywood assembly line includes first conveyor means for conveying back sheets, additional laminate layers and complete laminate structures through an assembly area. The apparatus also includes means for depositing back sheets onto the first conveyor means in end-to-end abutting relationship, the depositing means including a first curtain coater for coating the top side of the back sheets with a laminating adhesive. Second conveyor means convey plywood core laminate layers coated on their upwardly facing surfaces with laminating adhesive. Said top-surface adhesive-coated core laminate layers are deposited on said continuous layer of end-to-end abutting back sheets downstream from the means for depositing back sheets onto the first conveyor means. Plywood face sheets are deposited on the adhesive-coated top surfaces of said core laminate layers. Third means for conveying said face sheets are positioned downstream from said second means.

Further in accordance with the present invention, the apparatus and method utilize the following: Fourth conveyor means conveys plywood back sheets, with the fourth conveyor means extending at an angle (again, illustratively 90°) to the first conveyor means from an entry end remote from the first conveyor means to an exit end adjacent the first conveyor. The fourth conveyor means exit end is positioned along the first conveyor means between the third conveyor means exit end and the first conveyor means exit end. Again, the fourth conveyor means operates at a speed at least equal to the speed of the first conveyor means. A third curtain coater is provided for coating the top sides of the last-mentioned plywood back sheets, with the third curtain coater being positioned between the entry end exit ends of the fourth conveyor means. The last-mentioned top-side adhesive-coated plywood back sheets are deposited, adhesive-coated sides up, on top of the completed plywood laminate structure.

Fifth conveyor means conveys plywood core laminate layers, with the fifth conveyor means extending from an entry end remote from the first conveyor means at an angle (again, illustratively 90°) toward an exit end adjacent the first conveyor means. The fifth conveyor means exit end is located along the first conveyor means between the exit end of the fourth conveyor means and the exit end of the first conveyor means. The fifth conveyor means operates at a speed at least equal to the speed of the first conveyor means. A fourth curtain coater is provided for coating the top side of the last-mentioned core laminate layers with a laminating adhesive, the fourth curtain coater being positioned between the entry and exit ends of the fifth conveyor means. The top-side adhesive-coated core laminate layers are deposited from the fifth conveyor means exit end onto the top-side adhesive-coated plywood back sheets deposited from the fourth conveyor means onto the completed plywood laminate structure, to form on top of the completed plywood laminate structure a back sheet-core laminate layer substrate.

Sixth conveyor means are provided for conveying plywood face sheets, the sixth conveyor means extending from an entry end remote from the first conveyor means at an angle toward an exit end adjacent the first conveyor means, with the exit of the sixth conveyor means being located along the first conveyor means between the exit end of the fifth conveyor means and the exit end of the first conveyor means. Again, the sixth conveyor means operates at a speed at least equal to the speed of the first conveyor means. The last-mentioned face sheets are deposited from the sixth conveyor means exit end onto the last-mentioned back sheet-core laminate layer substrate to form, on top of the first-mentioned completed plywood laminate structure, a second completed plywood laminate structure.

Alternatively, or in addition to the above-described apparatus and method, the following apparatus and method may be utilized with the first, second, and third conveyor means and first and second curtain coaters: Intermediate conveyor means may be provided for conveying additional plywood core laminate layers, with the intermediate conveyor means extending from an entry end remote from the first conveyor means at an angle (again, illustratively 90°) toward an exit end adjacent the first conveyor means, with the exit end of the intermediate conveyor means being located along the first conveyor means between the second conveyor means and the third conveyor means. The intermediate conveyor means operates at a speed at least equal to the speed of the first conveyor means. An intermediate curtain coater is provided for coating the top sides of the additional plywood core laminate layers with a laminating adhesive. The intermediate curtain coater is positioned between the entry and exit ends of the intermediate conveyor means. The top-side adhesive-coated additional core laminate layers are deposited on the upwardly facing adhesive-coated surface of the back sheet-core laminate layer substrate. Utilizing this last-described method and apparatus, the completed plywood laminate structure is a multiple-core laminate structure.

With this evident high degree of flexibility to form 3-ply plywood, or other higher multiple-ply plywood, or to form one or more additional completed plywood laminate structures on top of the first completed plywood laminate structure, means are provided, illustratively adjacent the exit end of the first conveyor means, for cutting the plywood laminate structure into sheets of plywood laminate of desired length. Further means are provided for pressing the plywood laminate structure into compressed plywood laminate structure having substantially a desired finished plywood thickness.

The invention may best be understood by referring to the following description and accompanying drawings which illustrate the invention. In the drawings.

Figures 1, 2:
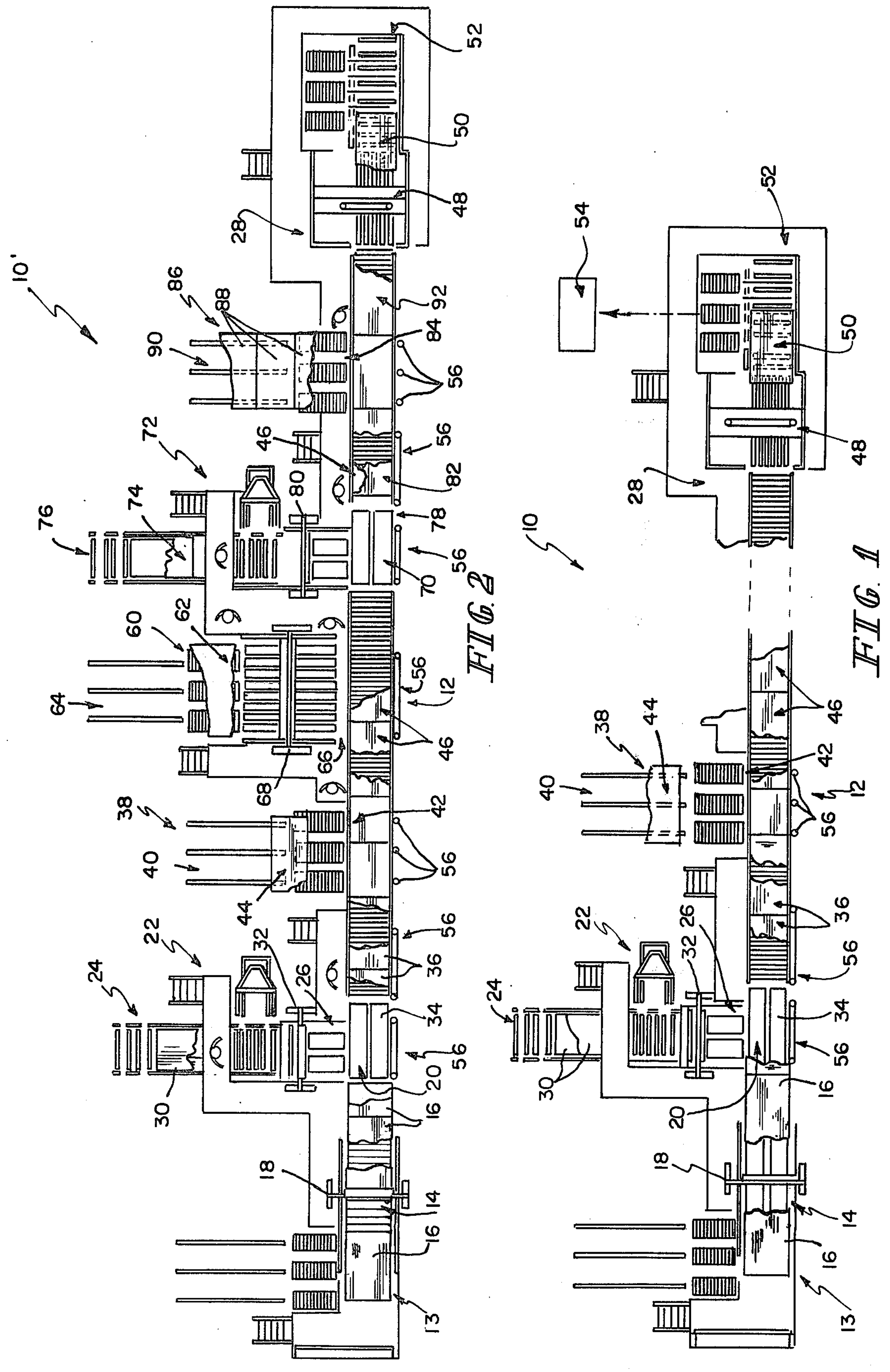
FIG. 1 is a top plan view illustrating, somewhat diagrammatically and fragmentarily, a 3-ply plywood laminate structure layup line.
FIG. 2 is a top plan view illustrating, somewhat diagrammatically and fragmentarily, a two-layer, 3-ply plywood laminate structure layup line.

Referring now particularly to FIG. 1, the plywood laminate structure assembly line 10 includes a first conveyor 12 for introduction of plywood back sheets, and transportation of the back sheets, back sheet-core laminate layer substrates, and completed laminate structures along the assembly line 10. The first conveyor 12 includes an entry end downstream from a first curtain coater 18. Assembly line 10 further includes a section 14 along which back sheets 16 are passed beneath first curtain coater 18 of the type described in the aforementioned Glaus U.S. Pat. No. 3,067,060 to coat the top side of the back sheets with a laminating adhesive.

A section 20 of the first conveyor 12 conveys the top-side adhesive-coated back sheet layer 16 past a second conveyor 22 having an entry end 24 and extending at a right angle to an exit end 26 disposed adjacent the first conveyor 12 between the entry end and the exit end 28 of the first conveyor 12. The second conveyor 22 conveys plywood core laminate pieces 30 beneath a second curtain coater 32. Coater 32 coats the top sides of the core laminate pieces 30 with a laminating adhesive. Means, including an overlying conveyor section 34, of the general type described in U.S. Pat. No. 3,725,183, conveys the top-side adhesive-coated core laminate layers 30 from the exit end 26 of the second conveyor 22 to deposit them upon the adhesive-coated top side of the end-to-end abutting layer of back sheets 16 to form a substantially end-to-end abutting layer of back sheet-core laminate substrate 36 with an upwardly facing, substantially continuous laminating adhesive-coated surface. Overlying conveyor section 34 is illustratively a sub-section of, and included in, second conveyor 22.

Downstream from the overhead conveyor section 34, a third conveyor 38 is provided. The third conveyor 38 includes an entry end 40 remote from the first conveyor 12 and exit end 42 adjacent the first conveyor 12. The third conveyor 38 conveys face sheets 44 to complete a 3-ply plywood laminate structure to the exit end 42. From the exit end 42 the plywood face sheets 44 are deposited in substantially end-to-end abutting relationship upon the top side of the adhesive-coated back sheet-core laminate layer substrate 36 to form a completed plywood laminate structure 46.

The completed plywood laminate structure 46 is conveyed downstream along the first conveyor 12 toward the exit end 28 where it is cut by a traversing saw 48 into sheets 50 of plywood laminate structure of desired lengths. The sheets 50 are stacked by an automatic panel stacker 52, and are subsequently transported to a plywood laminate structure pre-presser and presser, illustrated diagrammatically at 54, where the plywood laminate structure sheets 50 are compressed to finished plywood thickness.

It will be noted that the first conveyor 12 also includes vertical laminate structure reference rollers 56 alongside the first conveyor section edges at various points, such as where laminate structure components are introduced from the side of the first conveyor 12, to establish a reference edge for the back sheet layer 16, the back sheet-core laminate layer substrate 36, and the complete plywood laminate structure 46.

Turning now to FIG. 2, the assembly line for forming two 3-ply plywood laminate structures, one on top of the other, will be described. In this description, those items numbered identically with the items in FIG. 1 perform the same or similar functions.

In FIG. 2, the plywood laminate structure assembly line 10' includes the first conveyor 12 for conveying a back sheet layer 16. The first curtain coater 18 deposits an adhesive coating on the top side of the layers 16 to provide the top-side adhesive-coated back sheet layer. The second conveyor 22 including overhead conveyor section 34 deposits top-side adhesive-coated plywood core laminate pieces 30, coated by the second curtain coater 32, on top of the adhesive-coated back sheet layer to form a back sheet-core laminate layer substrate 36 with an adhesive coating on the top side thereof. The face sheets 44 are deposited from the exit end 42 of third conveyor 38 onto the adhesive-coated surface of the substrate 36 to form the completed plywood laminate structure 46.

At this point, a fourth conveyor 60 is provided to convey additional plywood back sheets 62 from its entry end 64 remote from conveyor 12 to its exit end 66 adjacent conveyor 12. A third curtain coater 68 is disposed between the entry and exit end 64, 66, respectively, of the fourth conveyor 60 to coat the top surfaces of the plywood back sheets 62 with a laminating adhesive. The fourth conveyor 60 conveys and deposits the top-side adhesive-coated plywood back sheets 62, adhesive-coated sides up, and in substantially end-to-end abutting relationship, on top of the completed plywood laminate structure 46.

As the substantially continuous layer of top-sided adhesive-coated plywood back sheets 62 is transported along the conveyor 12, it is conveyed beneath the overhead conveyor section 70 of a fifth conveyor 72 which conveys plywood core laminate pieces 74 from its entry end 76 remote from the first conveyor 12 toward its exit end 78 adjacent the conveyor 12. A fourth curtain coater 80 is disposed between the entry and exit ends 76, 78, respectively, of conveyor 72 to coat the top sides of the plywood core laminate pieces 74 with a laminating adhesive. From the overhead conveyor section 70, the top-side adhesive-coated plywood core laminate pieces 74 are deposited in substantially end-to-end abutting relationship on top of the top-side adhesive-coated plywood back sheets 62 to form a top-side adhesive-coated, back sheet-core laminate layer substrate 82, like the substrate 36, on top of the completed plywood laminate structure 46.

As substrate 82 moves downstream along the first conveyor 12, it passes the exit end 84 of a sixth conveyor 86 which conveys plywood face sheets 88 from its entry end 90 to exit end 84. The face sheets 88 are deposited from exit end 84 upon the back sheet-core laminate layer substrate 82 in substantially end-to-end abutting relationship to form, on top of the first complete plywood laminate structure 46, a second complete plywood laminate structure 92.

The two layers of completed plywood laminate structure 46, 92 are subsequently conveyed along the terminal section of the first conveyor 12 to traversing saw 48 which saws the layers 46, 92 into two layers of plywood laminate structure sheets 50. The automatic panel stacker 52 stacks the sheets 50, and they are subsequently transferred to a pre-presser and presser of the type illustrated diagrammatically at 54 in FIG. 1.

Figure 3:
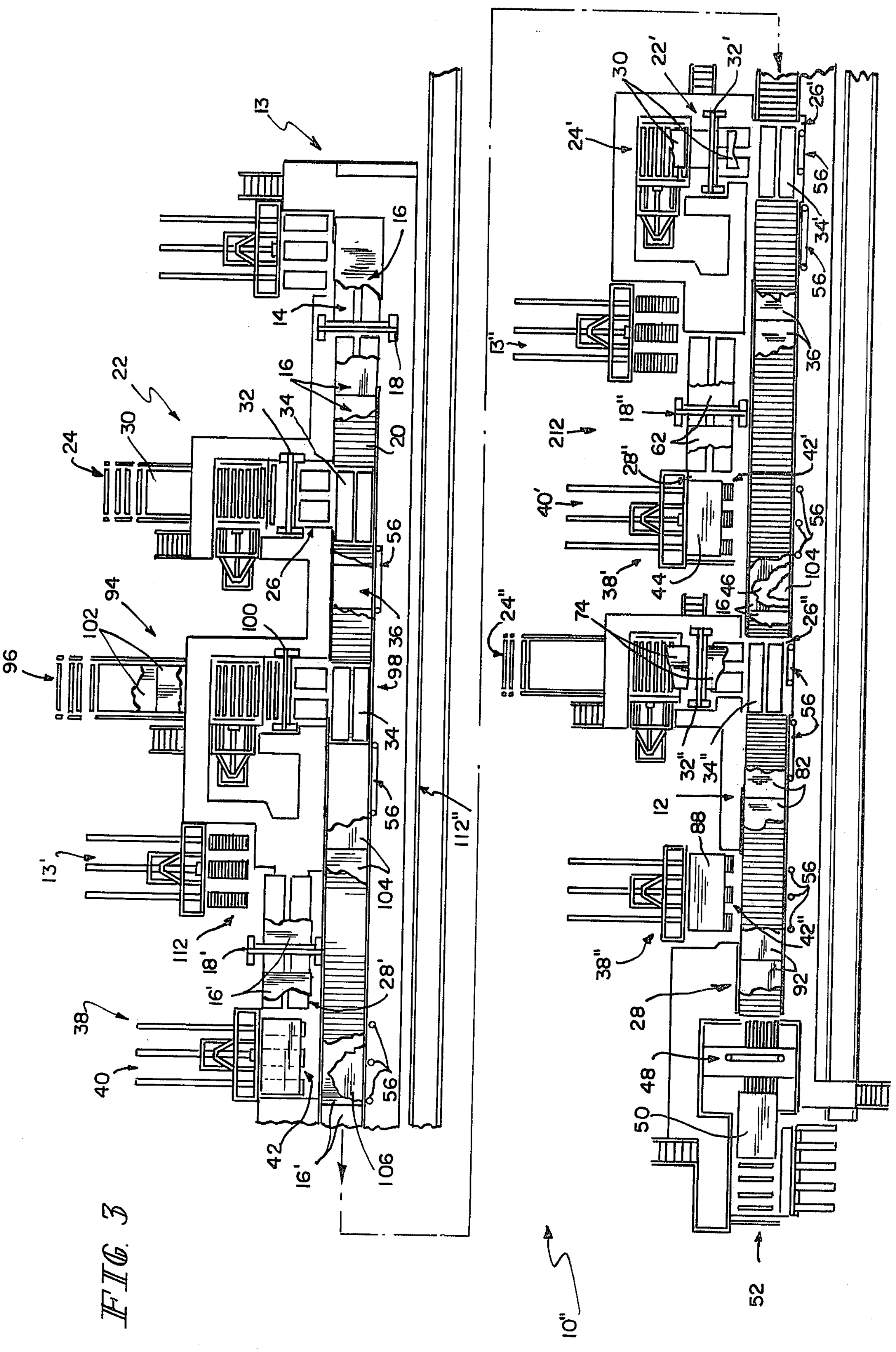
FIG. 3 is a top plan view illustrating, partly diagrammatically, a one-layer, 4-ply and two layer, 3-ply plywood laminate structure layup line.

In the embodiment of the invention illustrated in FIG. 3, those items which perform the same or similar functions to the items described in FIGS. 1–2 are identically numbered.

In FIG. 3, an alternative to the single-layer 3-ply plywood laminate structure-forming assembly line 10, and the double-layer, 3-ply plywood laminate structure assembly line 10′ is illustrated. In this assembly line 10″, a 4-ply (2 core) and two 3-ply plywood assembly operations are being conducted.

In this embodiment, the plywood laminate structure assembly line 10″ includes the first conveyor 12 for conveying the top-side adhesive-coated back sheet layer 16 past the exit end 26 of the second conveyor 22 at which plywood core laminated pieces 30 with an adhesive coating on their top sides are deposited upon layer 16 to form the top-side adhesive-coated back sheet-core laminate layer substrate 36. Then, downstream from the second conveyor 22 exit end 26, an intermediate conveyor 94 having an entry end 96 remote from conveyor 12 and an exit end 98 adjacent conveyor 12 is positioned. An intermediate curtain coater 100 is located on the conveyor 94 between its entry and exit ends 96, 98. Conveyor 94 conveys plywood core laminate pieces 102 from its entry end 96 beneath the curtain coater 100, which coats the top sides of pieces 102 with laminating adhesive. The top-side adhesive-coated core pieces 102 are deposited from exit end 98 by means of an overhead conveyor section 34 on top of the back sheet-core laminate layer substrate 36 to form a layer of back sheet-multiple core laminate layer substrate 104 with an upwardly facing adhesive-coated surface for accepting the face sheets 44 being deposited from the exit end 42 of the third conveyor 38.

It should further be noted that, in the embodiment of FIG. 3, a side conveyor 112 is positioned between the exit ends 42, 98 of the third and intermediate conveyors 38, 94, respectively. The side conveyor 112 includes an entry end 13′ and an exit end 28′. A curtain coater 18′ is disposed between the entry and exit ends 13′, 28′, respectively, to coat the top sides of additional back sheets forming a back sheet layer 16, with laminating adhesive. The exit end 28′ of side conveyor 112 discharges these top-side laminating adhesive-coated back sheets 16 onto the tops of the face sheets 44 being discharged from the exit end 42 of third conveyor 38. Then, as the face sheets 44 are deposited upon the back sheet-double core laminate layer substrate 104 to form a completed double core plywood laminate structure 106, the additional back sheet layer 16 is simultaneously deposited on top of completed double core plywood laminate structure 106.

Continuing downstream, an overhead conveyor section 34′ of a conveyor 22′ deposits top-side, laminating adhesive-coated plywood core pieces 30 onto the plywood back sheet layer 16′ to form, on top of the 4-ply completed plywood laminate structure 106, a back sheet-core laminate layer substrate 36 with a laminating adhesive-coated top surface.

Further downstream, an additional side conveyor 212 having an entry end 13″ and an exit end 28″ with a curtain coater 18″ disposed between the entry and exit ends 13″, 28″, respectively, is provided. Top-surface laminating adhesive-coated plywood back sheets 62 are deposited from conveyor 212 onto the uncoated top surfaces of face sheets 44 which are being fed on a conveyor 38′ toward the main conveyor 12″. The face sheets 44 with top-side adhesive-coated plywood back sheets 62 resting on top of them are deposited from the exit end 42′ of conveyor 38′ onto the back sheet-core laminate layer substrate 36. A 3-ply completed plywood laminate structure 46 is thus formed on top of the 4-ply completed plywood laminate structure 100 moving along the conveyor 12″. Simultaneously, a further 3-ply plywood laminate structure 92 is being started by the deposit of the plywood back sheet 62.

Continuing downstream along the main conveyor 12″, plywood core laminate pieces 74 are deposited from an overhead conveyor section 34″ of a conveyor 22″ onto the adhesive-coated back sheets 62 to form a back sheet-core laminate layer substrate 82. A curtain coater 32″ coats the top side surfaces of the plywood core laminate pieces 74 with laminating adhesive.

Finally, face sheets 88 are deposited from the exit end 42″ of a conveyor 38″ to form the third layer of complete plywood laminate structure 92. The vertical stack of completed plywood laminate structures 106, 46, 92 is transported along the conveyor 12″ to the traversing saw 48 where it is sawed into plywood laminate structures of desired lengths. The automatic panel stacker 52 stacks it vertically to form a stack with a 4-ply plywood laminate sheet, two 3-ply plywood laminate sheets resting on top of it, a 4-ply plywood laminate sheet, two 3-ply plywood laminate sheets resting on top of it, and so on. Finally, this stack is transported to a pre-presser and presser such as the one illustrated diagrammatically at 54 in FIG. 1.

It can be appreciated that there is substantial flexibility with the method and apparatus of the above-described invention. Additional core-depositing conveyor systems can be added for additional cores to provide any type of multiple-ply completed plywood laminated structure, as desired. Additional side conveyors, such as conveyors 112, 212 or conveyors 22, 94, 38, 38′, 38″, can be added to begin more plywood structures on top of the completed plywood laminate structures moving along the conveyor. To maintain the conveyors 12, 12′, 12″ completely loaded, and thereby to achieve maximum output from these conveyors, all of the side conveyors supplying additional core laminate layer pieces and face sheets must be capable of running at least as fast as the main conveyor. As explained, this means that these side conveyors must be capable of delivering at least as many board feet of a given laminate layer (be it a core layer, face sheet, or back sheet) as are moving along the main conveyor 12, 12′, 12″. With the instant inventive system, embodying a first curtain coater disposed upstream from, and adjacent the entry end of, the main assembly line to coat back sheets fed directly onto the main assembly line, side conveying of adhesive-coated back sheets is avoided.

The instant system results in economies of labor, as well as material (adhesive and wood). The instant system is highly flexible, being adaptable for use in the manufacture of plywood having virtually any number of plies, and in virtually any manufacturing combination (e.g., 3-ply on top of 3-ply on top of 4-ply, 4-ply on top of 4-ply, 7-ply on top of 3-ply, and so on).

On the majority of prior art continuous lines, laminating adhesive application is by spray. First, the back sheets are laid on the continuous line in end-to-end abutting relation. Glue is applied to the back sheet top surfaces while the sheets are running at normal production speeds of about 80 feet per minute (limited by the capacity of people to lay down core and face sheets on the line). Thus, while the assembly operation can take place at a speed of up to 80 feet per minute, a curtain coater must have plywood laminate layers passing through it at speeds of approximately 350 to 450 feet per minute to apply the desired laminating adhesive thickness. The instant inventive system utilizes side conveyors and faster moving conveyor sections to provide rapid laminate layer movement for suitably controlled application of laminating adhesive by curtain coaters. This system therefore is a marriage of continuous layup and curtain-coating techniques which has heretofore been impossible.

The invention also recognizes that curtain coating is superior to prior art methods for applying laminating adhesive to veneer for making plywood. The adhesive is spread more uniformly, providing much better bonding of the wood. Also, it has been found that suitable bonds giving wood failure rather than glue failure on testing are obtainable using less glue per unit area of wood than with prior art spray application techniques. The glue savings can amount easily to $2 per 1,000 sq. ft. of plywood. Some plywood manufacturers produce 150,000,000 to 250,000,000 sq. ft. of plywood per year. With the emphasis now on continuous plywood layup lines, curtain coating can yield great cost benefits.

What is claimed is:

1. A plywood assembly line, comprising a first means for conveying laminate layers through an assembly area, the first conveyor means extending longitudinally for substantially the full length of the assembly area, the first conveyor means including an entry end for introduction of plywood back sheets, and an exit end for removal of assembled plywood laminate structures, the plywood back sheets being introduced onto the entry end in end-to-end abutting relation, and the first conveyor means conveying the back sheets, additional laminate layers, and completed laminate structures at constant speed from the entry end to the exit end, a first curtain coater for coating the top side of the back sheets with a laminating adhesive, the first curtain coater positioned up line from and adjacent the entry end of the first conveyor means, second conveyor means for conveying plywood core laminate layers, the second conveyor means extending from an entry end toward an exit end adjacent the first conveyor means and positioned along the first conveyor means between the first curtain coater and the first conveyor means exit end, the second conveyor means operating at a speed at least equal to the speed of the first conveyor means, a second curtain coater for coating the top sides of the core laminate layers with a laminating adhesive, the second curtain coater positioned between the entry and exit ends of the second conveyor means, the one-side adhesive-coated core laminate layers being deposited from the exit end of the second conveyor means onto the adhesive-coated top side of the end-to-end abutting layer of back sheets moving on the first conveyor means to form a substantially end-to-end abutting layer of back sheet-core laminate layer substrate with an upwardly facing substantially continuous laminating adhesive-coated surface, third conveyor means for conveying face sheets and positioning them to be deposited on the laminating adhesive-coated top surface of the substantially end-to-end abutting back sheet-core laminate layer substrate to form a completed plywood laminate structure, the third conveyor means extending from an entry end toward an exit end adjacent the first conveyor means, the third conveyor means positioned along the first conveyor means between the second conveyor means exit end and the first conveyor means exit end, fourth conveyor means for conveying plywood back sheets, extending from an entry end to an exit end adjacent the first conveyor means, and positioned along the first conveyor means between the third conveyor means exit end and the first conveyor means exit end, the fourth conveyor means operating at a speed at least equal to the speed of the first conveyor means, a third curtain coater for coating the top sides of the last-mentioned plywood back sheets, the third curtain coater being positioned between the entry and exit ends of the fourth conveyor means, the one-side adhesive-coated plywood back sheets being deposited from the fourth conveyor means, adhesive-coated sides up, on top of the completed plywood laminate structure, fifth conveyor means for conveying plywood core laminate layers, the fifth conveyor means extending from an entry end to an exit end adjacent the first conveyor means, the fifth conveyor means exit end being located along the first conveyor means between the exit and of the fourth conveyor means and the exit end of the first conveyor means, the fifth conveyor means operating at a speed at least equal to the speed of the first conveyor means, a fourth curtain coater for coating the top sides of the last-mentioned core laminate layers with a laminating adhesive, the fourth curtain coater being positioned between the entry and exit ends of the fifth conveyor means, the one-side adhesive-coated core laminate layers being deposited from the exit end of the fifth conveyor means onto the one-side adhesive-coated plywood back sheets deposited from the fourth conveyor means onto the completed plywood laminate structure to form, on top of the completed plywood laminate structure, a back sheet-core laminate layer substrate, sixth conveyor means for conveying plywood face sheets and positioning them to be deposited on the last-mentioned back sheet-core laminate layer substrate to form, on top of the first-mentioned complete plywood laminate structure, a second complete plywood laminate structure, the sixth conveyor means extending from an entry end to an exit end adjacent the first conveyor means, the sixth conveyor means being located along the first conveyor means between the exit end of the fifth conveyor means and the exit end of the first conveyor means.

2. The apparatus of claim 1 and further comprising means for cutting said plywood laminate structure into sheets of plywood laminate of desired lengths.

3. The apparatus of claim 1 and further comprising means for compressing said plywood laminate structure into compressed plywood laminate structure having substantially a desired finished plywood thickness.

4. The apparatus of claim 1 and further comprising intermediate conveyor means for conveying additional plywood core laminate layers, the intermediate conveyor means extending from an entry end to an exit end adjacent the first conveyor means and positioned along the first conveyor means between the second conveyor means and the third conveyor means, the intermediate conveyor means operating at a speed at least equal to the speed of the first conveyor means, an intermediate curtain coater for coating the top sides of said additional plywood core laminate layers with a laminating adhesive, the intermediate curtain coater being positioned between the entry and exit ends of the intermediate conveyor means, said one-side adhesive-coated additional core laminate layers being deposited from the intermediate conveyor means on the upwardly facing adhesive-coated surface of said layer of back sheet-core laminate layer substrate to form a back sheet-multiple core laminate layer substrate with an upwardly facing adhesive-coated surface for accepting said face sheets from said face sheet depositing means, the completed plywood laminate structure being a multiple core laminate structure.

5. The apparatus of claim 4 and further comprising means for cutting said multiple core plywood laminate structure into sheets of multiple core plywood laminate of desired lengths.

6. The apparatus of claim 4 and further comprising means for compressing said multiple core plywood laminate structure into compressed multiple core plywood laminate structure having substantially a desired finished plywood thickness.

7. A method of assembling plywood, comprising passing plywood back sheets through a first curtain coater for coating the top side of the back sheets with a laminating adhesive, introducing the plywood back sheets onto the entry end of a first conveyor means in end-to-end abutting relation, the first conveyor means conveying the back sheets longitudinally through an assembly area from the first conveyor means entry end to a first conveyor means exit end for removal of assembled plywood laminate structures, the first conveyor means conveying at a constant speed from its entry end to its exit end, conveying plywood core laminate layers on a second conveyor means extending from an entry end remote from the first conveyor means to an exit end adjacent the first conveyor means and positioned along the first conveyor means between the first conveyor means entry end and the first conveyor means exit end, the second conveyor means operating at a speed at least equal to the speed of the first conveyor means, passing said core laminate layers through a second curtain coater for coating the top sides of the core laminate layers with a laminating adhesive, the second curtain coater positioned between the entry and exit ends of the second conveyor means, depositing the one-side adhesive-coated core laminate layers from the exit end of the second conveyor means on the adhesive-coated top side of the end-to-end abutting layer of back sheets moving on the first conveyor means to form a substantially end-to-end abutting layer of back sheet-core laminate layer substrate with an upwardly facing substantially continuous laminating adhesive-coated surface, conveying face sheets on a third conveyor means extending from an entry end remote from the first conveyor means toward an exit end adjacent the first conveyor means, the third conveyor means positioned along the first conveyor means between the second conveyor means exit end and the first conveyor means exit end, and depositing the face sheets from the exit end of the third conveyor means on the laminating adhesive-coated top surface of the substantially end-to-end abutting back sheet-core laminate layer substrate to form a completed plywood laminate structure, conveying plywood back sheets on a fourth conveyor means extending from an entry end remote from the first conveyor means to an exit end adjacent the first conveyor means, and positioned along the first conveyor means between the third conveyor means exit end and the first conveyor means exit end, the fourth conveyor means operating at a speed at least equal to the speed of the first conveyor means, passing the last-mentioned plywood back sheets through a third curtain coater for coating the top sides of said last-mentioned plywood back sheets, the third curtain coater being positioned between the entry and exit ends of the fourth conveyor, depositing the one-side adhesive-coated plywood back sheets, adhesive-coated sides up, on top of the completed plywood laminate structure, conveying plywood core laminate layers on a fifth conveyor means extending from an entry end remote from the first conveyor means to an exit end adjacent the first conveyor means, the fifth conveyor means being located along the first conveyor means between the exit end of the fourth conveyor means and the exit end of the first conveyor means, the fifth conveyor means operating at a speed at least equal to the speed of the first conveyor means, passing the last-mentioned core laminate layers through a fourth curtain coater for coating the top sides of the last mentioned core laminate layers with a laminating adhesive, the fourth curtain coater being positioned between the entry and exit ends of the fifth conveyor means, depositing the one-side adhesive-coated core laminate layers from the exit end of the fifth conveyor means onto the one-side adhesive-coated plywood back sheets deposited from the fourth conveyor means onto the completed plywood laminate structure to form on top of the completed plywood laminate structure a back sheet-core laminate layer substrate, conveying plywood face sheets on a sixth conveyor means extending from an entry end to an exit end adjacent the first conveyor means, the sixth conveyor means being located along the first conveyor means between the exit end of the fifth conveyor means and the exit end of the first conveyor means, and depositing the face sheets from the exit end of the sixth conveyor means on the last-mentioned back sheet-core laminate layer substrate to form, on top of the first-mentioned complete plywood laminate structure, a second completed plywood laminate structure.

8. The method of claim 7 and further comprising the step of cutting said plywood laminate structure into sheets of plywood laminate of desired lengths.

9. The method of claim 7 and further comprising the step of compressing said plywood laminate structure into compressed plywood laminate structure having substantially a desired finished plywood thickness.

10. The method of claim 7 and further comprising conveying additional plywood core laminate layers on intermediate conveyor means, said intermediate conveyor means extending from an entry end to an exit end adjacent the first conveyor means and positioned along the first conveyor means between the second conveyor means and the third conveyor means, the intermediate conveyor means operating at a speed at least equal to the speed of the first conveyor means, coating the top sides of said additional plywood core laminate layers with a laminating adhesive on an intermediate curtain coater, the intermediate curtain coater being positioned between the entry and exit ends of the intermediate conveyor means, and depositing said one-side adhesive-coated additional core laminate layers on the upwardly facing adhesive-coated surface of said layer of back sheet-core laminate layer substrate to form a back sheet-multiple laminate layer substrate with an upwardly facing adhesive-coated surface for accepting said face sheets from said face-sheet depositing means, the completed plywood laminate structure being a multiple core laminate structure.

11. The method of claim 10 and further comprising the step of cutting said multiple core plywood laminate structure into sheets of multiple core plywood laminate of desired lengths.

12. The method of claim 10 and further comprising the step of compressing said multiple core plywood laminate structure into compressed multiple core plywood laminate structure having substantially a desired finished plywood thickness.

13. Apparatus for assembling plywood laminate structures on a plywood assembly line including first conveyor means for conveying a continuous layer of end-to-end abutting back sheets, additional laminate layers and complete laminate structures from the entry end to the exit end of the first conveyor means, the first conveyor means extending through an assembly area, means for loading back sheets onto the entry end of the first conveyor means in end-to-end abutting relationship, a first curtain coater for coating the top side of the back sheets with a laminating adhesive, a second curtain coater for coating the top sides of core-laminate layers with a laminating adhesive, second conveyor means for conveying the plywood core laminate layers coated on their upwardly facing surfaces with laminating adhesive and for positioning said top-surface adhesive-coated core laminate layers to be deposited on said continuous layer of end-to-end abutting back sheet downstream from the entry end of the first conveyor means, and third conveyor means for depositing plywood face sheets on the adhesive-coated top surfaces of said core laminate layers, said third conveyor means being positioned downstream from said second means, fourth conveyor means for conveying plywood back sheets, the fourth conveyor means being positioned along the first conveyor means downstream from the third conveyor means, a third curtain coater for coating the top sides of the last-mentioned plywood back sheets, the top-side adhesive-coated plywood back sheets being deposited from the fourth conveyor means, adhesive-coated sides up, on top of the completed plywood laminate structure, fifth conveyor means for conveying plywood core laminate layers, the fifth conveyor means being located along the first conveyor means downstream from the fourth conveyor means, a fourth curtain coater for coating the top sides of the last-mentioned core laminate layers with a laminating adhesive, the one-side adhesive-coated core laminate layers being deposited from the fifth conveyor means onto the one-side adhesive-coated plywood back sheets deposited from the fourth conveyor means onto the completed plywood laminate structure to form, on top of the completed plywood laminate structure, a back sheet-core laminate layer substrate, sixth conveyor means for conveying plywood face sheets, the sixth conveyor means being located along the first conveyor means downstream from the fifth conveyor means, the face sheets being deposited from the sixth conveyor means on the last-mentioned back sheet-core laminate layer substrate to form, on top of the first-mentioned complete plywood laminate structure, a second complete plywood laminate structure.

14. The apparatus of claim 13 in which the first curtain coater is positioned upstream from and adjacent the entry end of the first conveyor means, the second conveyor means extends from an entry end toward an exit end adjacent the first conveyor means and is positioned along the first conveyor means between the first conveyor means entry end and the first conveyor means exit end, the second curtain coater for coating said top sides of the core laminate layers with laminating adhesive is positioned between the entry and exit ends of the second conveyor means, said top-surface adhesive-coated core laminate layers being deposited from the exit end of the second conveyor means in substantially end-to-end abutting relation on the adhesive-coated top side of the end-to-end abutting layer of back sheets to form a substantially end-to-end abutting layer of back sheet-core laminate layer substrate with an upwardly facing substantially continuous laminating adhesive-coated surface, the third conveyor means conveying face sheets and positioning them to be deposited on the laminating adhesive-coated top surface of the substantially end-to-end abutting back sheet-core laminate layer substrate to form a completed plywood laminate structure, the third conveyor means extending from an entry end toward an exit end adjacent the first conveyor means, the third conveyor means positioned along the first conveyor means between the second conveyor means exit end and the first conveyor means exit end.

15. The apparatus of claim 14 and further comprising intermediate conveyor means for conveying additional plywood core laminate layers, the intermediate conveyor means extending from an entry end to an exit end adjacent the first conveyor means and positioned along the first conveyor means between the second conveyor means and the third conveyor means, an intermediate curtain coater for coating the top sides of said additional plywood core laminate layers with a laminating adhesive, the intermediate curtain coater being positioned between the entry and exit ends of the intermediate conveyor means, said one-side adhesive-coated additional core laminate layers being deposited from the intermediate conveyor means on the upwardly facing adhesive-coated surface of said layer of back sheet-core laminate layer substrate to form a back sheet-multiple core laminate layer substrate with an upwardly facing adhesive-coated surface for accepting said face sheets from said face-sheet depositing means, the completed plywood laminate structure being a multiple core laminate structure.

16. The apparatus of claim 14 in which the fourth conveyor means extends from an entry end toward an exit end adjacent the first conveyor means and is positioned along the first conveyor means between the third conveyor means exit end and the first conveyor means exit end, the third curtain coater is positioned between the entry and exit ends of the fourth conveyor means, the fifth conveyor means extends from an entry end to an exit end adjacent the first conveyor means and is positioned along the first conveyor means between the fourth conveyor means exit end and the first conveyor means exit end, the fourth curtain coater is positioned between the entry and exit ends of the fifth conveyor means, the sixth conveyor means extends from an entry end to an exit end adjacent the first conveyor means and is positioned along the first conveyor means between the fifth conveyor means exit end and the first conveyor means exit end, the one-side adhesive-coated core laminate layers being deposited from the fifth conveyor means exit end and the face sheets being deposited on the last-mentioned back sheet core laminate layer substrate from the sixth conveyor means exit end.

* * * * *